(12) United States Patent
Puri et al.

(10) Patent No.: US 9,072,637 B1
(45) Date of Patent: Jul. 7, 2015

(54) SELF LEVELING CRADLE AND REMOVABLE CONTAINER

(71) Applicants: Kathleen F. Puri, Chattanooga, TN (US); Arun Puri, Chattanooga, TN (US); Caroline F. Puri, New York, NY (US); John C. Ekholm, Chicago, IL (US)

(72) Inventors: Kathleen F. Puri, Chattanooga, TN (US); Arun Puri, Chattanooga, TN (US); Caroline F. Puri, New York, NY (US); John C. Ekholm, Chicago, IL (US)

( * ) Notice: Subject to any disclaimer, the term of this patent is extended or adjusted under 35 U.S.C. 154(b) by 3 days.

(21) Appl. No.: 14/065,535

(22) Filed: Oct. 29, 2013

Related U.S. Application Data

(63) Continuation-in-part of application No. 13/940,340, filed on Jul. 12, 2013.

(60) Provisional application No. 61/671,549, filed on Jul. 13, 2012.

(51) Int. Cl.
*A61G 7/05* (2006.01)
*A47G 23/02* (2006.01)
*B60N 3/10* (2006.01)

(52) U.S. Cl.
CPC ............ *A61G 7/0503* (2013.01); *A61G 7/0507* (2013.01); *A47G 23/0225* (2013.01); *A61G 7/05* (2013.01); *B60N 3/106* (2013.01)

(58) Field of Classification Search
CPC ..... A61G 7/0503; A61G 7/0507; A61G 7/05; A47G 23/0225; B60N 3/106
USPC ............. 248/311.2, 302, 314; 5/503.1, 507.1, 5/658
See application file for complete search history.

(56) References Cited

U.S. PATENT DOCUMENTS

| 2,926,879 | A | * | 3/1960 | Dietrich | 248/311.2 |
| 4,191,350 | A | * | 3/1980 | Ormond | 248/311.2 |
| 5,857,601 | A | * | 1/1999 | Greenwood | 248/311.2 |
| 8,033,518 | B2 | * | 10/2011 | Schuchman | 248/311.2 |
| 2011/0016632 | A1 | * | 1/2011 | Hopf | 5/503.1 |

* cited by examiner

*Primary Examiner* — Peter M Cuomo
*Assistant Examiner* — Brittany Wilson
(74) *Attorney, Agent, or Firm* — Stephen J. Stark

(57) ABSTRACT

A caddy for use with hospital staff or patients provides a rigid housing having a cradle which supports a container with at least one vertically and, preferably, at least one horizontally accessible compartments. A back of the cradle connects to a connector which connects to a hospital bed rail at a pivot to maintain the container in a pre-determined relationship while the rail is angled relative to a horizontal surface. The container is preferably removable relative to the cradle.

18 Claims, 8 Drawing Sheets

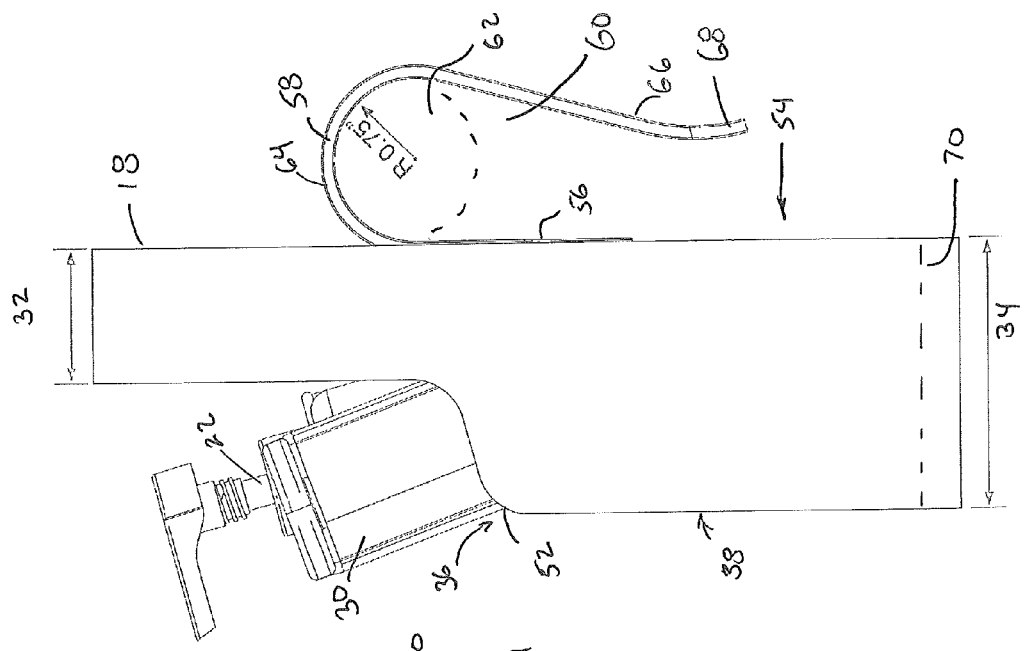
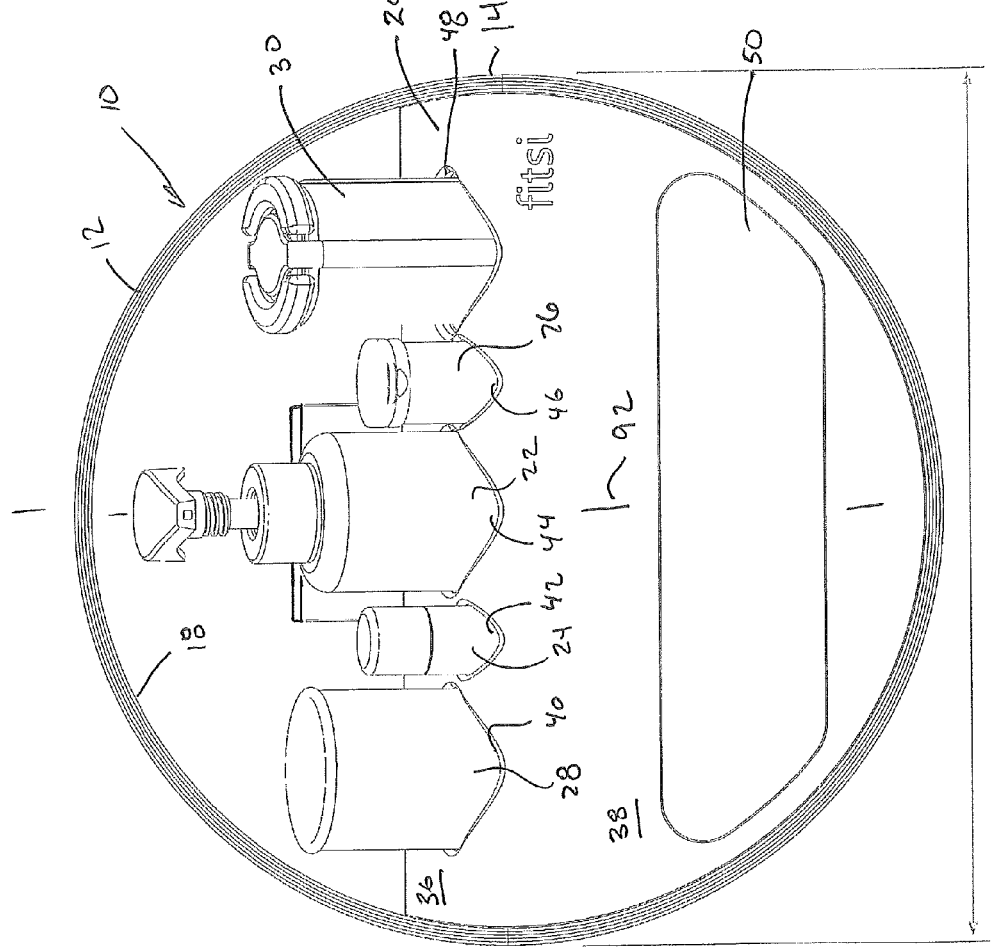
FIG. 2
FIG. 1

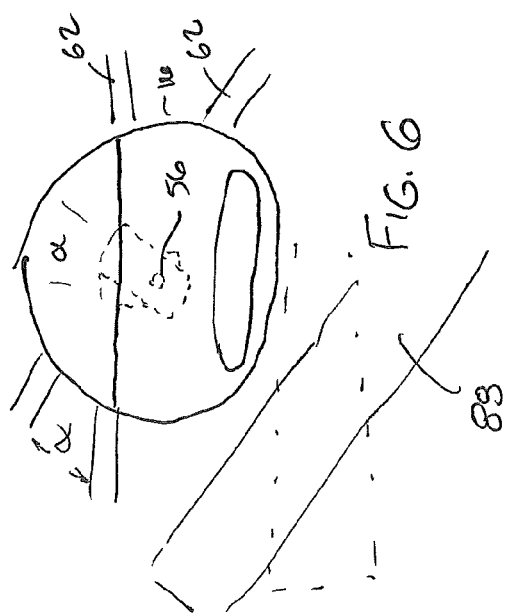
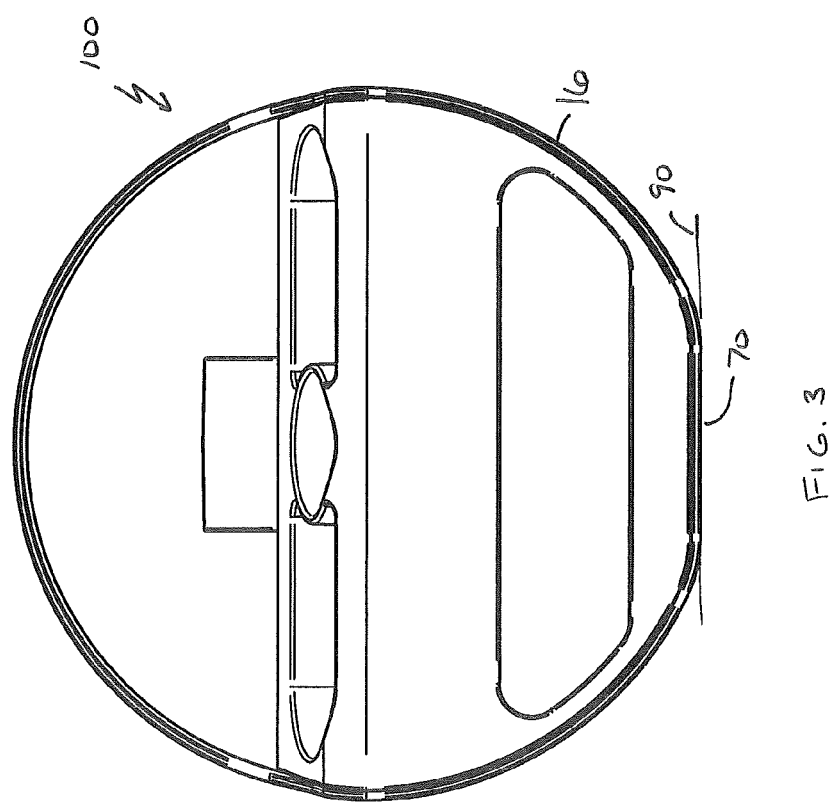

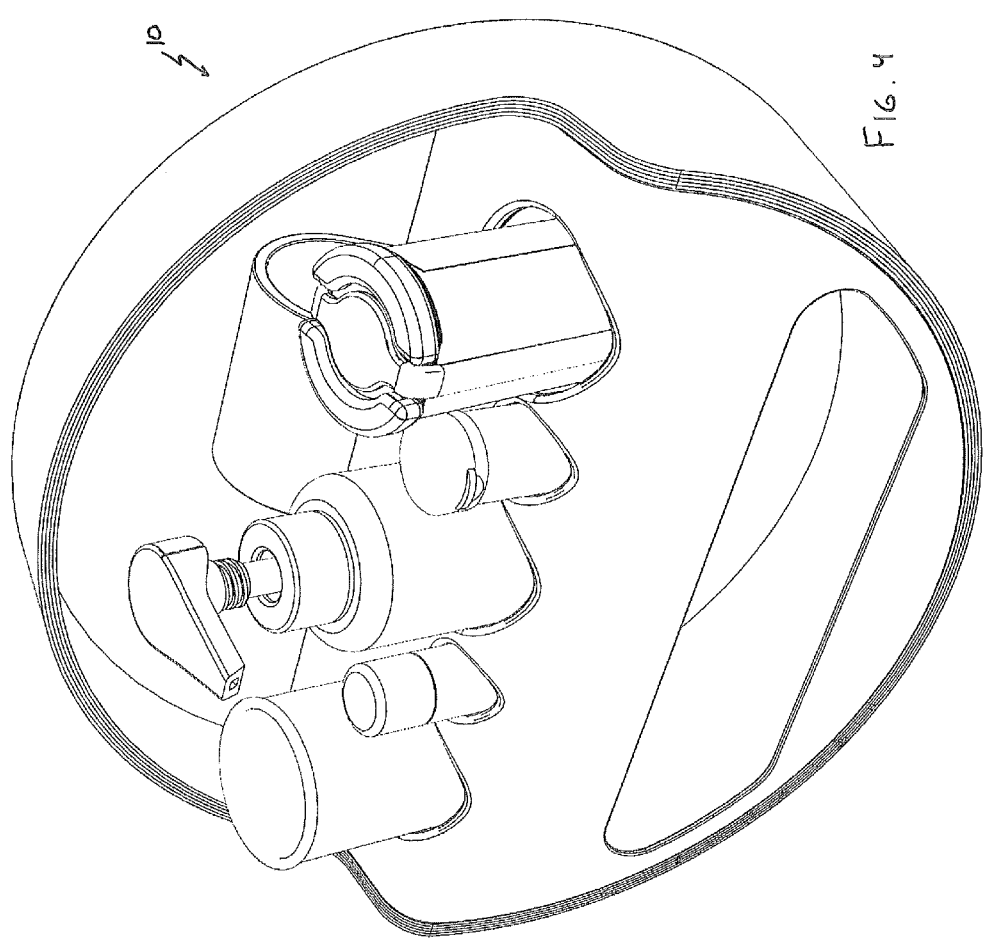

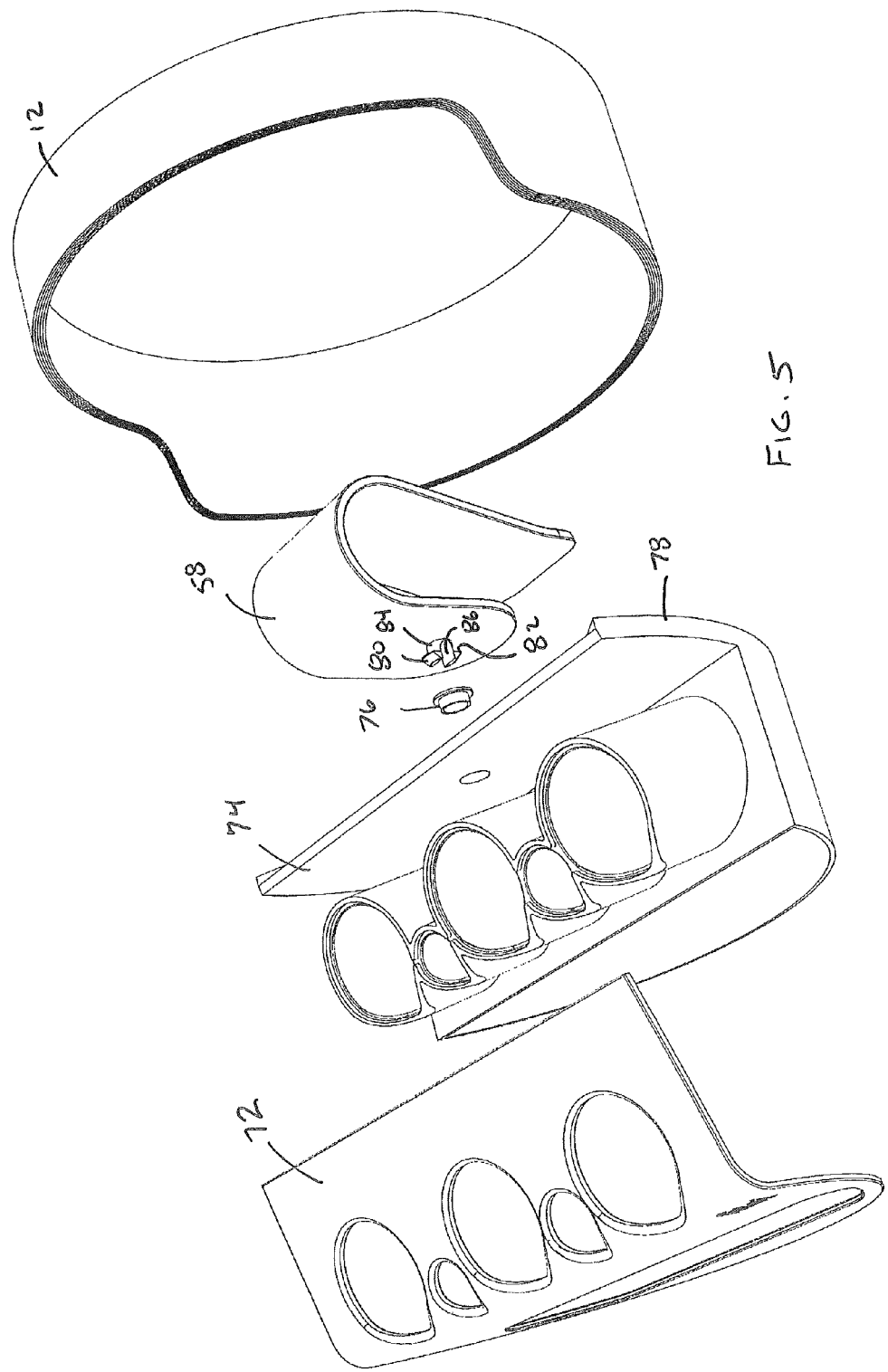

SELF LEVELING CRADLE AND REMOVABLE CONTAINER

CLAIM OF PRIORITY

This application is a continuation in part application of U.S. patent application Ser. No. 13/940,340 filed Jul. 12, 2013 which claims the benefit of U.S. Provisional Patent Application No. 61/671,549 filed Jul. 12, 2012, which are both incorporated herein by reference in their entirety.

BACKGROUND OF THE INVENTION

Numerous parties have developed travel caddy constructions for various purposes. Design patent No. D656,317 shows a construction that could be hung over a door or a rail. Other devices, such as D522,750 and D420,510 appear to be more narrowly directed to use with a hospital bed rail.

Other, more durable caddy structures have also been utilized with hospital bed rails such as U.S. Pat. Nos. 4,504,992, 6,253,399 and 5,651,152.

However, the applicant is unaware of any attempt to make any of these devices where they are self leveling. Specifically, hospital beds normally raise and lower the head and torso of a patient relative to their legs so they can sit up. For the prior art caddy structures, articles on them might tend to slide off onto the floor or fall out when at an angle to the horizontal.

Additionally, while some have handles such as U.S. Pat. No. 5,447,237, none are known to have a convenient construction taking advantage of their shape for aesthetics and possibly balance as well.

SUMMARY OF THE INVENTION

It is a present object of many embodiments of the present invention to provide a hospital caddy for use by patients and/or medical personnel to store items alongside of a hospital bed.

It is a present object of many embodiments of the present invention to provide a hospital caddy for use by patients and/or medical personnel to provide a self-leveling caddy which can maintain a predetermined relationship to horizontal regardless of the angle of the bed rail to which the caddy is attached.

It is a present object of many embodiments of the present invention to provide a hospital caddy for use by patients and/or medical personnel to provide a caddy which can be easily removed from hospital bed rails and sat on a horizontal surface in a horizontal configuration.

It is a present object of many embodiments of the present invention to provide a hospital caddy for use by patients and/or medical personnel to provide a rigid storage device having multiple storage compartments in close proximity to a patient for various uses.

It is a present object of at least some embodiments to provide a caddy support or cradle which is self-leveling while being connectable to a removable caddy. Accordingly, when the patient is discharged, the removable caddy may be taken with the patient, or discarded, and the support, for at least some embodiments, sterilized, and a new caddy supported by and/or connected to the support.

Accordingly, in accordance with a presently preferred embodiment of the present invention, an improved cradle supports a storage container supported thereby. The storage compartment can take on a variety of configurations, but may, for at least some embodiments, be made of a recyclable material, such as pressed paper (possibly somewhat akin to paper mache) which can be formed to have a storage configuration for receiving items in wells or otherwise. Some items could be held in a vertical arrangement and, possibly some in a horizontal or other arrangement for at least some embodiments in compartments in the storage container. The carriage may have a rounded or flat bottom which has been found helpful for some embodiments to provide an ability to stand easily when not attached to a hospital bed rail.

For many embodiments, a back of the carriage has a self-leveling connector or hook which connects to a bed rail and is rotatably connected to the carriage so that as the bed rail is angled the carriage remains in a position to maintain the container in the horizontal configuration with the compartments remaining in a desired orientation to at least attempt to prevent articles from falling out or being difficult to access. The connector may connect via a pivot to the carriage.

Some embodiments may have a multi-piece carriage which allows for a cover over at least some of the compartment space. The support container preferably rests on a base of the carriage, and may be securely connected to the carriage such as with pins, snaps, and/or other connectors at a bottom, back and/or other location of the storage container. A friction fit, such as with a front and the back of the carriage may hold and/or assist in holding a support container in the carriage.

The compartments may take on various forms, whether to hold an anti-microbial hand gel or hand sanitizer, a toothbrush and/or toothpaste, cell phone, note pad, exercise band, lip balm, lotion or possibly storage for such items as glasses, combs, etc.

After use by a patient, the storage container may be removed relative to the carriage and either sent home with the patient, discarded, etc. A new, preferably or possibly sanitary storage container may then be placed in and/or on the carriage, possibly after sanitizing the carriage, for at least some embodiments. The storage container is preferably secured to the carriage for the next patient's use.

BRIEF DESCRIPTION OF DRAWINGS

The particular features and advantages of the invention as well as other objects will become apparent from the following description taken in connection with the accompanying drawings in which:

FIG. 1 is a front plan view of a first alternative preferred embodiment of the present invention;

FIG. 2 is a side plan view of the first alternatively preferred embodiment of the present invention while also showing a first alternatively preferred embodiment in phantom;

FIG. 3 is a front plan view of a second alternatively preferred embodiment of the present invention;

FIG. 4 is a front perspective view of the embodiment of FIG. 1;

FIG. 5 is an exploded view of the embodiments of FIGS. 1-2 and 4;

FIG. 6 is a front schematic view of the embodiment of FIGS. 1-2 and 4-5 in use;

DETAILED DESCRIPTION OF THE PREFERRED EMBODIMENTS

Figure 7:
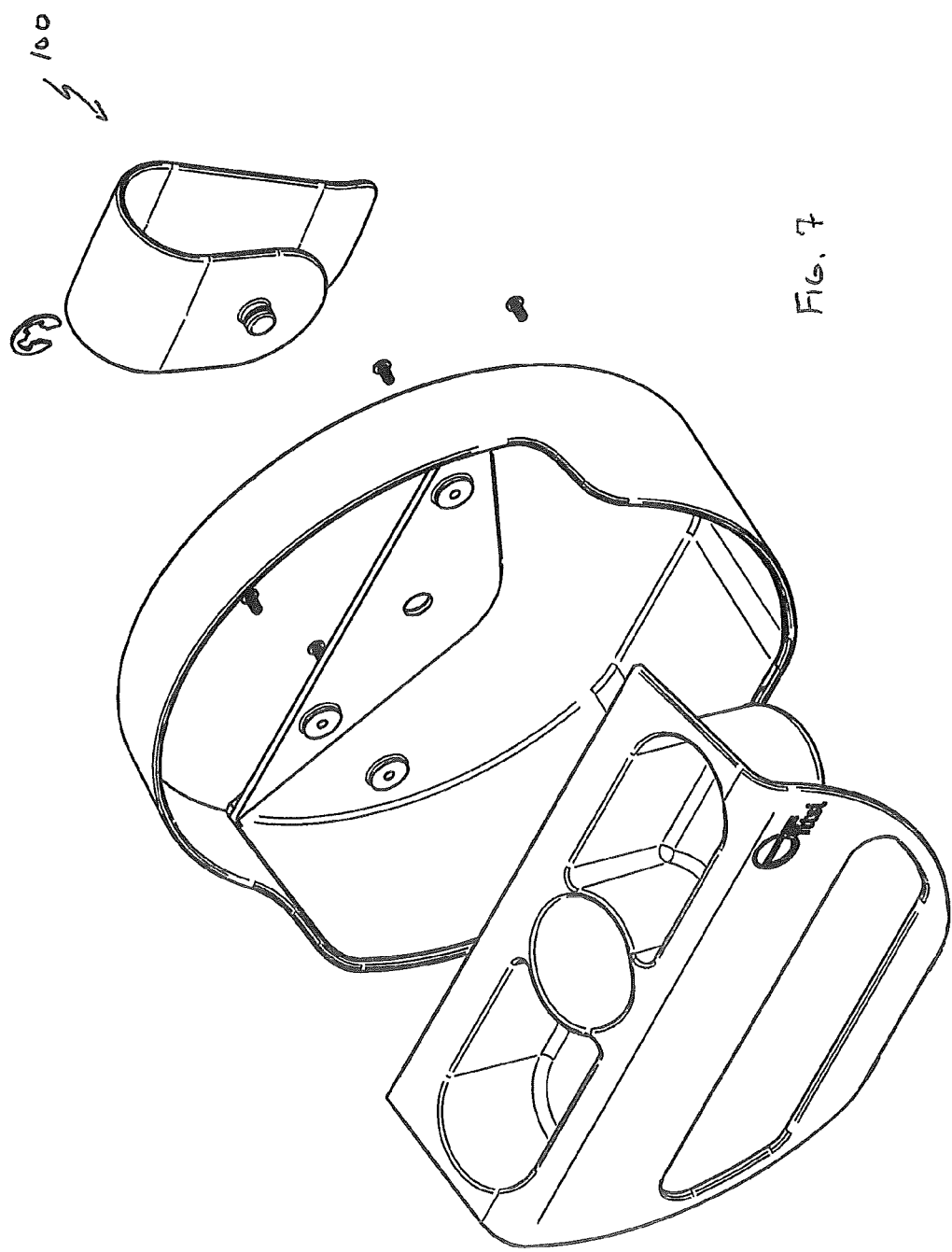
FIG. 7 is an exploded view of the embodiment of FIG. 3.

FIG. 1 shows a caddy 10 of an alternatively preferred embodiment of the invention. Specifically, a housing 12 provides a circular cross section or perimeter 14 for many embodiments, or a substantially circular cross section or perimeter 16 (as shown in FIG. 3 for a first preferred embodiment as will be explained in detail below).

The housing 12 preferably provides at least a substantially semi-circular handle 18 above a carriage 20 which is preferably utilized to hold such items as one or more pump dispensers 22 which could be used to hold hand sanitizer (if not provided in an another style container) and/or lotion, etc. lip balm 24, container 26, glass 28, toothbrush/toothpaste holder(s) 30, exercise bands, and/or provide general storage such as for glasses, mobile phones, etc.

The handle 18 may transition into the carriage 20 such as is shown in the figures, but for many embodiments, the width 32 of the handle 18 is preferably no more than about half of the width 34 of the carriage.

Carriage 20 is shown having a top face 36 and a front face 38. The top has vertically accessible compartments 40, 42, 44, 46, 48 illustrated with other embodiments possibly having more or fewer and/or with different configurations as at least one vertically accessible compartment (40-48). The front face 38 preferably provides at least one horizontally accessible compartments 50 which is illustrated as being perpendicularly oriented relative to the vertically accessible compartments 40-48 with the vertically accessible compartments 40-48 being located above the horizontally accessible compartment(s) 50. Also, for at least many of the preferred embodiments, the vertically accessible compartments 40-48 as well as the horizontally accessible compartment(s) 50 are symmetrically disposed about a center line 92 of the housing 12.

From FIG. 2, one can see that for at least some embodiments, the vertical accessible compartments 40-48 does not necessarily preclude insertion from an angle from above such as is shown with the pump dispenser 22 and the toothbrush/toothpaste holder(s) 30.

The housing 18 is preferably a rigid material such as a plastic which could be injection formed, vacuum formed or otherwise provided. The carriage 20 may be a similar or different rigid material, preferably for many embodiments with a different color scheme than the housing 18. In the preferred embodiment, the housing 12 surrounds, supports, and/or even encircles the carriage.

The carriage 20 preferably bends at bend 52 to transition from the top face 36 to the front face 38. Housing 18 may provide this similar shape as shown in FIG. 2.

At a back 54 of the carriage 20 or housing 12 a connector 58 is preferably rotatably connected at a pivot 56. The connector 58 provides at least a slot 60 for receiving a hospital bed rail 62 therein. The connector 58 illustrated is a clip providing a the slot at elbow 64 which extends on to arm 66 and hand which bends away from arm 64 to allow one, such as a patient or hospital personnel, to press the clip onto the rail 62.

FIG. 2 also shows optional flat 70 which is better shown in FIG. 3. Flat 70 provides a planar surface onto which the caddy 100 can sit (without being connected to a rail 62) in a horizontal position/configuration. Flat 70 need not be provided for all embodiments as can be seen with reference to FIGS. 1 and 4. FIGS. 3 and 7 show the construction of a first alternatively preferred embodiment 100.

FIG. 5 shows an exploded view showing the housing 12 separated from the carriage 20. The carriage may be multi-piece such as with cover 72 covering base 74 which provides much of the compartments therein with the cover 72 providing the aesthetics. Of course, other embodiments could be constructed differently. FIG. 5 also shows the connection of the connector 58 connecting at a bushing 76 to provide a pivot at the carriage 20 (the bushing 76 effectively serves as a nut and would for this embodiment, be on the other side of wall 78 to receive shoulders 80,82 on posts 84,86 as would be understood by those of ordinary skill in the art. This embodiment just provides one way to provide a pivot 56. Other embodiments may provide the pivot differently.

By providing pivot 56, as the angle of the rail 62 changes, such as normally occurs when the rail 62 is raised/lowered with one portion of a hospital bed 88 relative to another as is shown in FIG. 6, then an angle alpha is created whereby the angle alpha is the angle relative to horizontal (as shown in FIG. 1). The pivot similarly rotates relative to the position shown in Figure by the same angle alpha to maintain the horizontal configuration as shown in FIG. 6. This is referred to by the applicant as self-leveling. The patient need not make the rotation for many embodiments, but instead, gravity acting on the carriage 20, the housing 12 and/or the components in the caddy preferably provide the rotation as the angle alpha is changed. Thus, the caddy 10 with its pivot 58 maintains the housing 18 at a predetermined position relative to the horizontal surface 90 as shown in FIG. 3.

As shown in FIG. 6 in phantom, the pivot 56 is at a center portion of the housing perimeter 16, but could be at other locations such as connected to either the housing 12 and/or carriage 20 for other embodiments at various locations.

Figure 8:
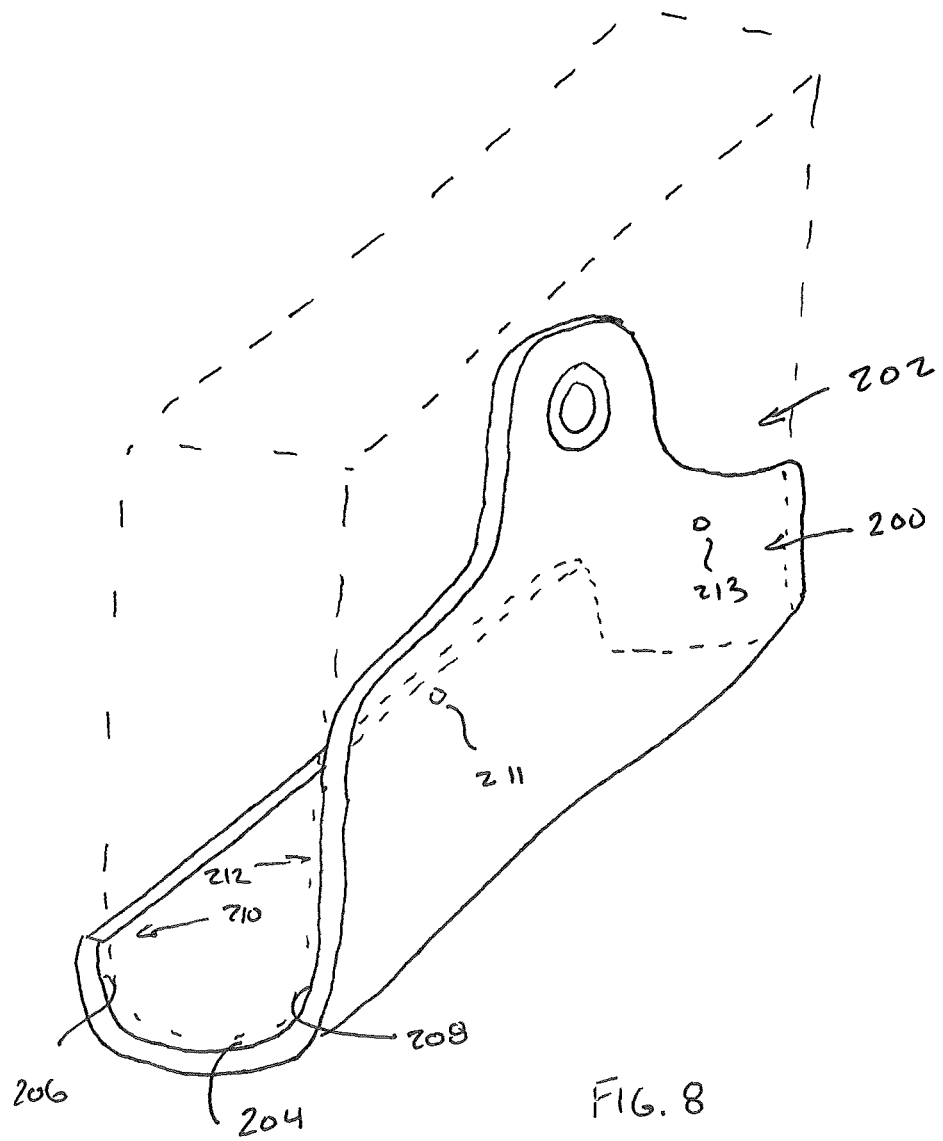
FIG. 8 is a rear perspective view of a first preferred embodiment of a cradle, with the storage container shown in phantom, and the connector such as is better shown in FIGS. 2 and 5-7.

FIG. 8 shows a cradle 200 not too different from base 74. This design is slightly different in that the cradle 200 possibly does not have portions of compartments therein. It can be made of the materials described above, such as a suitable plastic, metal and/or combination thereof. It is preferably constructed in a way to be re-usable, possibly being designed with a preference for being able to relatively easily sanitize between patients.

This cradle 200 is designed to support a container 202 such as from a bottom 204. The carriage may have a front 206 and a back 208 which may, for at least some embodiments, assist in providing a friction fit of a container 202 in the cradle 200. As illustrated a rear 210 of the front 206 and a front 212 of the back 208 assist in locating the container 202 on the cradle 200.

Figure 9:
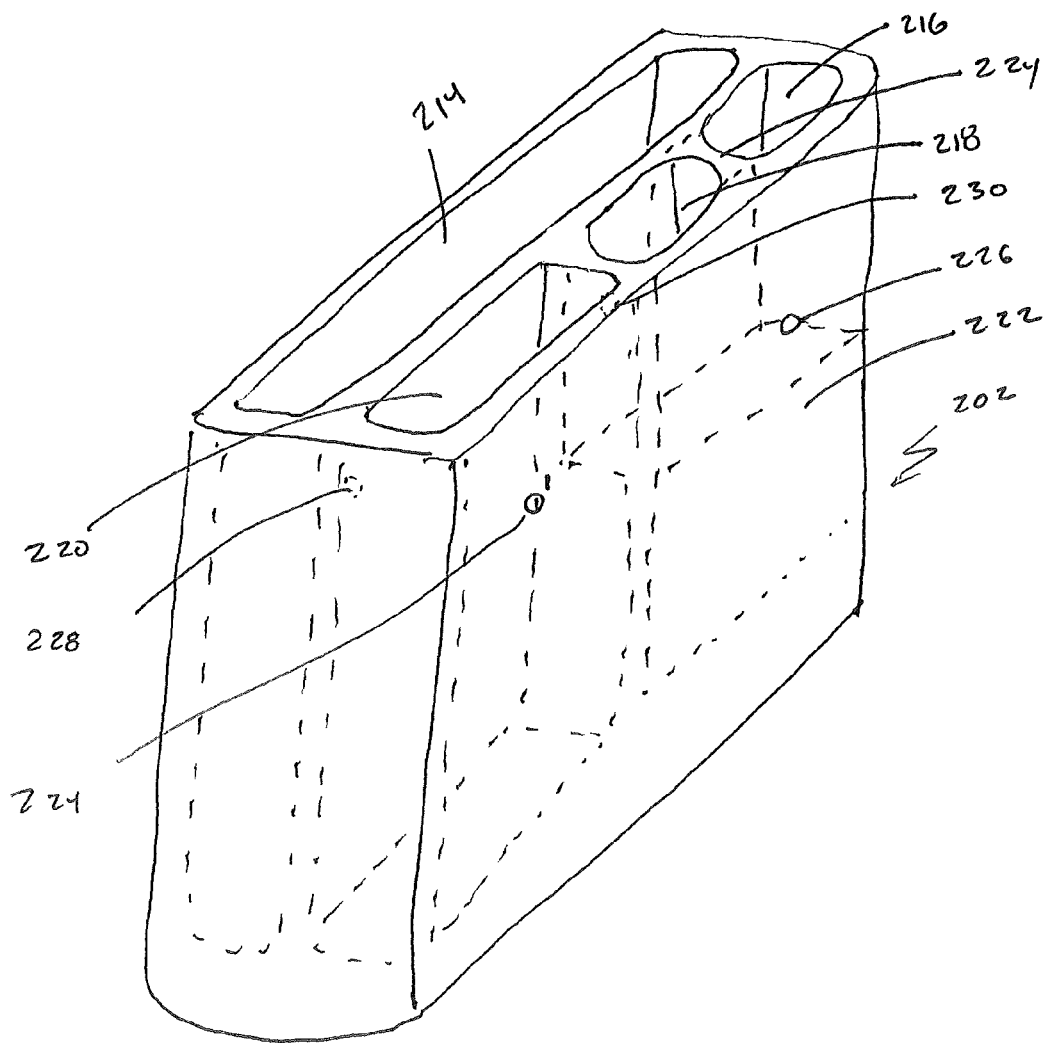
FIG. 9 is a front perspective view of a support container for use with the cradle of FIG. 8 with at least some internals shown in phantom.

Container 202 is shown in FIG. 9. A plurality of vertically disposed wells or compartments 214,216,218, 220 are illustrated. Compartment 214 may accept a tablet style computer, such as an iPad™. Compartments 216-220 may accept hand sanitizers, tissues, glasses and/or cell phones or other items such as might be desirable for a patient to have readily available possibly as described above relative to other embodiments.

Inserts, such as insert 222 may be useful to adjust the depth of compartments, such as by making the compartments 216 and 218 less deep than 214 or 220. A single insert 222 could span multiple compartments such as if divider 224 is not present. The use of inserts allows for customization of the container 202 for multiple uses, such as if provided by a company pre-loaded with hand sanitizer in compartment 216 or other compartment and/or for other uses. Inserts 222 may be removed by users or left in place.

Inserts 222 may be constructed of various materials. For many embodiments paper products will make a sufficiently strong insert 222. Other embodiments may have differently constructed inserts 222, however a folded paper product as illustrated works well for many embodiments.

Bores 224, 226, 228 and/or 230 may be useful to securely connect some containers 202 to cradles 200 for at least some embodiments. More, or fewer may be provided. Other embodiments may use bores 224-230 or other connectors to assist in connecting containers 202 cradles 200. Cradle bores 211, 213 may cooperate with any of bores 224-230 for pin(s) 238 to assist in connecting the cradle 200 to the container 202. Other devices may connect differently, if at all in a secure manner as illustrated.

Figure 10:
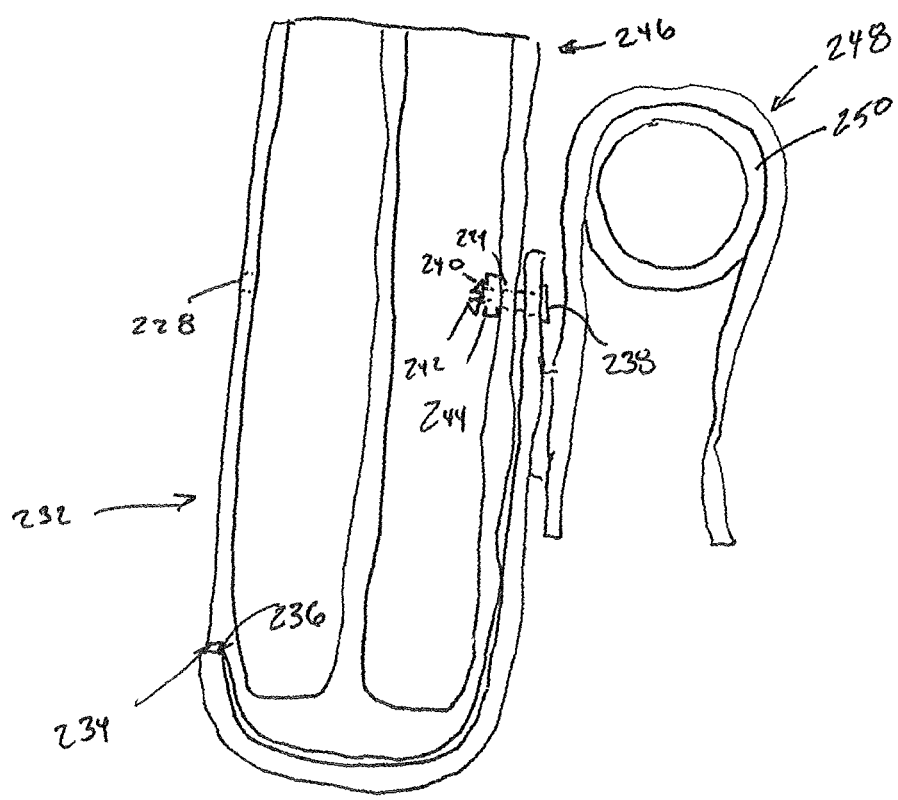
FIG. 10 is a side cross sectional view of the first preferred embodiment with the container of FIG. 9 installed relative to the cradle of FIG. 8.

Looking at FIG. 10, the container 202 is resting on a bottom 204 of the cradle 200. In addition to the possibility of a friction fit as described above, a front 232 of the container may have a cutout or lip 234 which rests on face 236 of cradle 200. Still other connection device may assist for at least some embodiments, such as bores 224 and/or 228 which may assist in retaining a snap or pin such as pin 238. Legs 240,242 may be able to direct through nut 244 so that the pin 238 can be removed and thus assist in removing the container 202 from the cradle 200. There are certainly many other connection devices that could be utilized with other embodiments, preferably to securely connect at least one of a front 232 and back 246 of the container 202 to the cradle 200. Some embodiments may not have a capability of selecting which direction the container 202 into a cradle 200.

The containers 202 and/or cradles 200 can take on various shapes and/or configurations as would be understood of those of ordinary skill in the art.

The connector 248 for connecting to a bedrail 250 is preferably constructed as is shown for the other embodiments, and is preferably self-leveling as described herein. Other embodiments may be constructed differently. A top 252 of the container may be above the pivot 254 of the connector 248 for at least some embodiments.

The container 202 may be constructed of any suitable material(s). Some embodiments may utilize earth-friendly materials, such as recycled or recyclable materials. Paper, such as a paper-mache like construction has been found to be particularly attractive. Various coatings may be applied and/or graphics as desired by the manufacturer.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A self-leveling caddy in combination with a hospital vertically extending bed rail, said combination comprising:
   a rigid cradle extending below and supporting thereabove a removably detachable container thereon, said container having a plurality of compartments therein and said container forming a friction fit connection to the cradle when in an installed configuration;
   a connector connected to the cradle, said connector having a slot receiving a hospital bed rail therein; and
   wherein said connector is connected at a rearwardly extending pivot to the cradle, whereby as the hospital bed rail is angled relative to a horizontal surface at an angle, alpha, the pivot rotates at the angle, alpha to maintain the container at a predetermined position of the container relative to the horizontal surface, said pivot extending perpendicularly and rearwardly relative to a vertically extending perimeter of the cradle.

2. The self-leveling caddy of claim 1 wherein the cradle has a bottom onto which the container is located.

3. The self-leveling caddy of claim 2 wherein the container has at least one vertically accessible compartment.

4. The self-leveling caddy of claim 3 wherein the container has a top providing the at least one vertically accessible compartment above the pivot.

5. The self-leveling caddy of claim 2 wherein the cradle has a front spaced by the bottom from a back of the cradle, the container has a front lip which rests on top of the front of the cradle when installed.

6. The self-leveling caddy of claim 1 wherein the cradle provides the friction fit between a front and a back of the cradle with the container secured therebetween in the installed configuration with the container in contact with the front and back of the cradle.

7. The self-leveling caddy of claim 1 wherein the container has at least one bore through which a connector at least assists in connecting the container to the cradle.

8. The self-leveling caddy of claim 7 wherein the cradle has at least one cradle bore through which a pin passes through the cradle bore and a first bore of the container at least assisting in connecting the cradle to the container.

9. The self-leveling caddy of claim 1 wherein an insert is located in at least one of the vertically oriented compartments thereby shortening a depth of the compartment.

10. A caddy in combination with a hospital bed rail, said combination comprising:
    a container detachably connected to and supported by a cradle, said cradle forming a slot between a front and a back above a bottom, with the container retained within the slot and contacting the front back and bottom of the cradle in an installed configuration;
    a connector connected to the cradle, said connector having a slot receiving a hospital bed rail therein; and
    wherein said connector is connected at a rearwardly extending pivot to the cradle, whereby as the hospital bed rail is angled relative to a horizontal surface at an angle, alpha, the pivot rotates at the angle, alpha to maintain the container at a predetermined position of the container relative to the horizontal surface, said pivot extending perpendicularly and rearwardly relative to a vertically extending perimeter of the cradle.

11. The caddy of claim 10 wherein the carriage has at least one vertically accessible compartment.

12. The caddy of claim 11 wherein the container has a top face located above the pivot.

13. The caddy of claim 12 wherein the container forms a friction fit within the cradle when installed.

14. The self-leveling caddy of claim 13 wherein the container has a front lip which rests on top of the front of the cradle when installed.

15. The self-leveling caddy of claim 10 wherein the cradle provides a friction fit between a front and a back with the container secured therebetween.

16. The caddy of claim 15 wherein the pivot is centrally located relative to the cradle.

17. The caddy of claim 10 wherein the pivot is located at a back of the cradle.

18. The self-leveling caddy of claim 10 wherein the cradle has at least one cradle bore through which a pin passes through the cradle bore and a first bore of the container at least assisting in connecting the cradle to the container.

* * * * *